March 21, 1944. E. H. HARDER 2,344,511
TREATMENT OF CRYSTALLINE VINYLIDENE CHLORIDE POLYMERS
Filed April 17, 1941 2 Sheets-Sheet 1

INVENTOR
ERNEST H. HARDER
BY Griswold & Burdick
ATTORNEYS

Patented Mar. 21, 1944

2,344,511

UNITED STATES PATENT OFFICE 2,344,511

TREATMENT OF CRYSTALLINE VINYLIDENE CHLORIDE POLYMERS

Ernest H. Harder, Midland, Mich., assignor to The Dow Chemical Company, Midland, Mich., a corporation of Michigan Application April 17, 1941, Serial No. 388,970

8 Claims. (Cl. 18—54)

This invention relates to a treatment of crystalline vinylidene chloride polymers, and particularly to a method whereby the tensile strength of articles produced from such polymers may be materially improved.

Most natural and synthetic plastics are amorphous when examined by X-ray diffraction methods. Many of the polymer products, whether polymers, co-polymers, interpolymers, or otherwise named, produced from vinylidene chloride alone or with other polymerizable materials, are crystalline when examined by X-ray diffraction methods. The crystalline character of such bodies gives them properties which are unique in the field of organic thermoplastics.

While normally crystalline vinylidene chloride polymers are thermoplastic, and may be deformed by heat and pressure in much the same manner as may the amorphous plastics, they may also be treated with marked advantage by a series of operations described and claimed in U. S. Patent No. 2,183,602. The said patent teaches that vinylidene chloride and many of its co-polymers, which are here defined as being crystalline, when first heated to a temperature above their respective softening points and then chilled, become super-cooled, and that in this condition they may be cold-worked, as by stretching or rolling. In the case of filaments or films of crystalline vinylidene chloride polymers, such as are claimed in U. S. 2,233,442, the treatment just outlined, if properly controlled, produces articles of high tensile strength as compared with similar articles of the usual amorphous polymers. The X-ray diffraction patterns of these articles give evidence of a distinct orientation of the sub-microscopic crystallites. It is desired, however, to effect even greater increase in the strength of articles producible from crystalline vinylidene chloride polymers.

To this end, it is, accordingly, an object of the present invention to provide a method whereby the tensile strength of articles made from crystalline vinylidene chloride polymers may be materially improved even over that of similar articles produced according to the cold-working step of the method of U. S. 2,183,602. Other and related objects will become apparent hereinafter.

The foregoing and related objects are attained, according to the invention, by a method to be more particularly described hereinafter with respect to the accompanying drawings, wherein are shown curves illustrating the effect of temperature changes on the properties of crystalline vinylidene chloride polymers.

Figure 1:
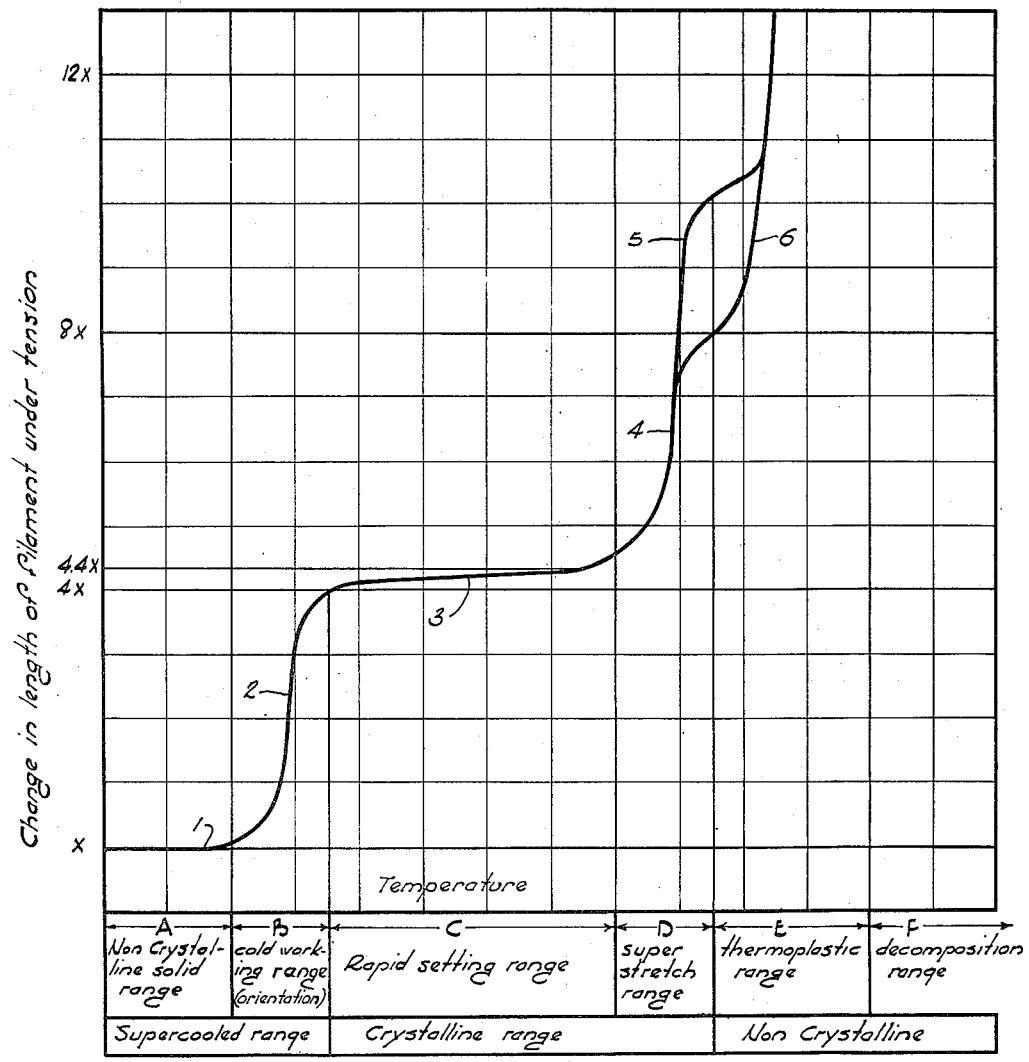
Figure 1 shows a curve representing diagrammatically the elongation under tension of normally crystalline vinylidene chloride polymer mono-filament in various physical states from the non-crystalline, or supercooled, solid range to the decomposition range.
Figure 2:
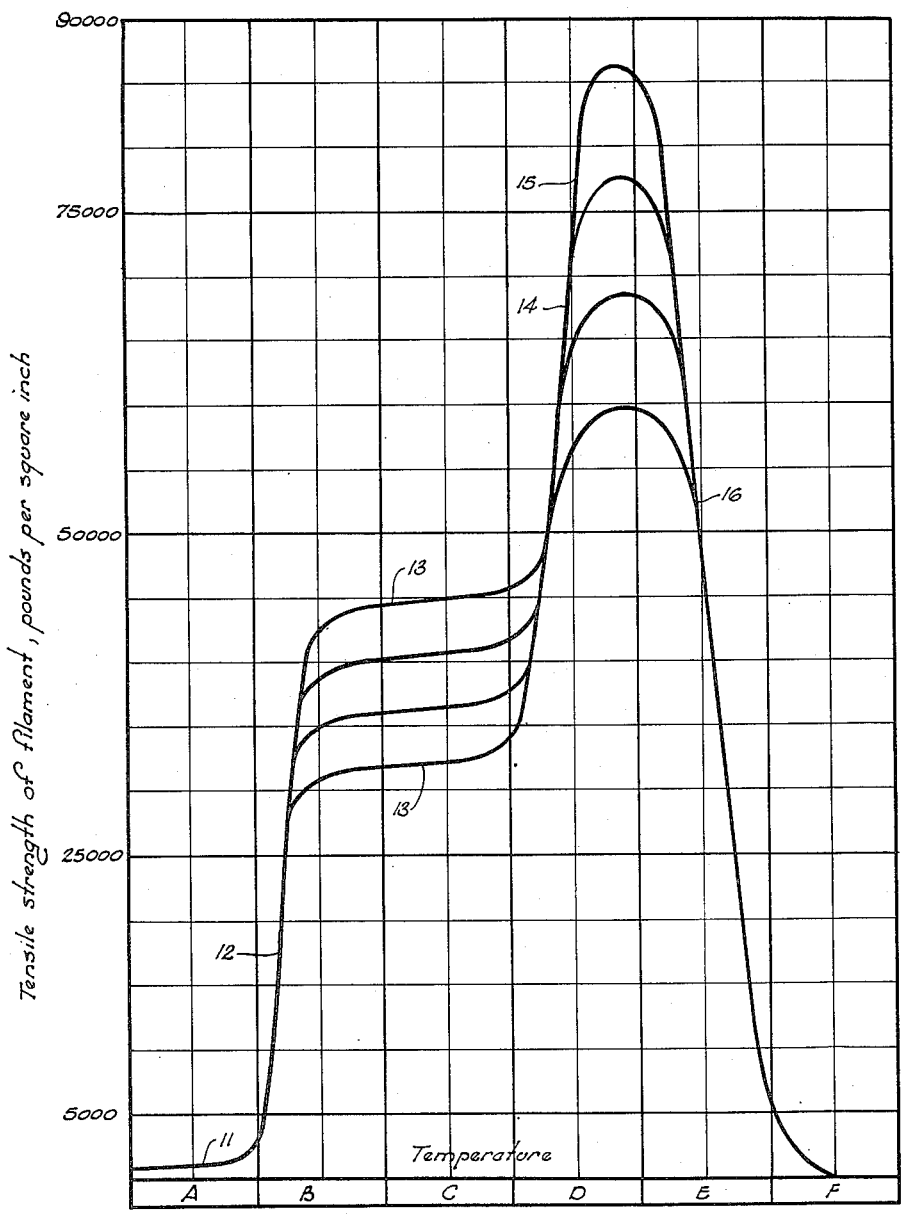
Figure 2 is a series of curves showing the effect on the tensile strength of normally crystalline vinylidene chloride polymer mono-filament subjected to various loads in the several physical states.

The invention comprises, broadly, providing an article of a crystalline vinylidene chloride polymer which exhibits fiber orientation by X-ray methods, and heating the article to a super-stretching temperature within the crystalline temperature range for that polymer, and below but within about 50 centigrade degrees of the softening point thereof, while applying tension just short of the breaking load, continuing the treatment until there is attained a definite permanent elongation of the article, and cooling the article at least to below the superstretch temperature range, preferably while still under tension, and releasing the tension.

In order that the various temperature ranges employed may be more clearly understood, the typical behavior of a filament of a normally crystalline vinylidene chloride polymer subjected to various tests over the entire temperature range from below 0° C. to the decomposition point of the polymer, will be described. Such a filament may be prepared by first heating to above its softening point a mass of a vinylidene chloride polymer or co-polymer which is crystalline by X-ray diffraction criteria. When fused, the polymer becomes non-crystalline to the X-ray. The fused mass is extruded and chilled at least to room temperature. If now the filament is cooled further (with dry ice, for example), it is a non-crystalline solid of very low tensile strength and quite brittle. When kept at a temperature below about 10° C. it remains substantially non-crystalline to the X-ray for a long time, any crystallization proceeding very slowly. At temperatures from about 10° C. to about 30° C. crystallization is somewhat more rapid, but may still require several hours or even from 2 to 3 weeks, depending on the composition, if the filament is left undisturbed at such temperatures. In the entire range below about 30° C. the polymer is said to be supercooled, so long as it has not crystallized to any appreciable extent. In the range from 10° to 30° C. the supercooled polymer may be cold-worked, i. e., stretched, rolled, or otherwise plastically deformed. Such deformation is the result of plastic flow in the cold polymer, and is accompanied by rapid crystallization and orientation of the submicroscopic crystallites. In the case of a supercooled filament, stretching results in rapid crystallization and orientation along the filament axis. It also results in an elongation of the order of 400 per cent, and a strength increase from a value ordinarily below 1000 pounds per square inch in the supercooled filament to a value of from 30,000 to 50,000 pounds in the stretched filament. If further tension is applied to the stretched and oriented filament, it exhibits elastic stretch only to the extent of about 10 per cent, even at temperatures up to about 50 centigrade degrees below its softening point. If the supercooled filament had been subjected to a temperature between about 30° C. and about 50 centigrade degrees below its softening point, it would have crystallized rapidly even on standing and would "set," i. e., not be capable of being oriented to any appreciable extent by stretching without again being fused and supercooled. The temperature range above 30° C. in which crystallization is more rapid, and in which no material plastic flow occurs, may be called the rapid setting range.

It has now been found that beyond the rapid setting range and below the softening point of the polymer, another critical temperature range exists in which the filament, stretched as described above and in U. S. 2,183,602, is still crystalline, but in which, if tension is applied to the filament, the latter may be further elongated by a factor of at least 50 per cent, and usually from 80 to 150 per cent or more, of its former stretched length, and, when cooled, exhibits a much greater strength than before, and a much sharper crystal orientation in its X-ray diffraction patterns. This critical temperature range may be called the superstretch range. The strength of the superstretched filament produced in the manner just described is commonly of the order of 60,000 to 100,000 pounds per square inch.

If a superstretched filament, or any other filament of a crystalline vinylidene chloride polymer, is heated above the melting point of the composition, the evidence of crystallinity soon disappears and, while stretching results in considerable elongation of the filament, the strength of the resultant product is very low. At still higher temperatures, the polymer decomposes. No amount of working at temperatures above the softening point results in any strength improvement.

The polymer of vinylidene chloride as well as those of its co-polymers and their plastic compositions which behave in the manner above described are referred to herein as "normally crystalline vinylidene chloride polymers," since it has been found that the temperature-property relationships above-outlined hold only for those vinylidene chloride products which exhibit evidences of crystallinity by X-ray diffraction methods.

Referring now to the drawings, a filament of a normally crystalline vinylidene chloride polymer which has been formed by extrusion of the fused polymer and chilled to a temperature in range A, below about 10° C., has little strength (11) and is capable of negligible stretching (1) in that range. When warmed above about 10° C. into temperature range B, and stretched to about 4 times its supercooled length (2), it gains considerable strength (12). The product has at this stage undergone the treatment recited in U. S. 2,183,602. Heated further, under tension, through temperature range C, only elastic stretch occurs (3), to the extent of about 10 per cent its length after stretching in range B. No material increase in strength is noted (13). When heating is continued into temperature range D, which may be called the superstretch range, tension still being maintained on the filament, further elongation (4, 5) of at least about 50 per cent (i. e., to at least 6 times, and usually from 7 to 10 times its supercooled length) is obtained, and the tensile strength is increased by several thousand pounds per square inch (14, 15). Heating to a higher temperature, either in the softening range E or the decomposition range F may result in further elongation of the filament, if under tension (6), or it may result in shrinkage of the filament, if not under tension, but is accompanied by disappearance of crystallinity and loss of strength (16).

The general relationship between potential length, strength, and working temperature given above holds true for all crystalline vinylidene chloride polymers, the limits of temperatures constituting range D varying somewhat depending on the particular composition being operated on. Superstretch temperatures (range D) are always below the softening point of the composition. They are always above room temperature, and are ordinarily limited to the 50 centigrade degrees or so immediately below the softening point.

The following example illustrates the practice of the invention but is not to be construed as limiting.

*Example*

A co-polymer of about 90 per cent vinylidene chloride and correspondingly about 10 per cent vinyl chloride, plasticized with 15 per cent of its weight of a 50–50 mixture of di-(alpha-phenylethyl) ether and ortho-xenoxy propylene oxide, had a softening point near 137° C. The composition was crystalline, as evidenced by X-ray diffraction patterns. Filaments were produced therefrom by the cold stretching method claimed in U. S. 2,183,602. These filaments had tensile strengths of about 40,000 to 42,000 pounds per square inch. The filaments were suspended in a glycerine bath with a tension applied to each filament approaching, but short of, the breaking load. The bath was heated to a temperature in the superstretch range D, which, for this composition, is between about 100° and 135° C. The actual temperature employed was 120° C. Heating was continued, and tension maintained, for from 15 minutes for some filaments to 1.5 hours for other filaments. During this treatment the filaments increased in length by from 80 to 150 per cent and decreased in diameter correspondingly. Most of the filaments were removed from the hot bath while still under tension and were then cooled to room temperature, and the tension released. In the case of the remaining filaments, the tension was first released and then the filament removed from the bath, and cooled. All of the filaments had tensile strengths above 65,000 pounds per square inch, and those on which tension had been maintained until they were cooled at least to below the superstretch temperature range, had tensile strengths of 75,000 to 90,000 pounds.

A comparison was made between the superstretched filaments whose preparation has just been described and the parent filament from which they had been prepared, which had, in turn, been made by cold-stretching a supercooled filament in temperature range B. The filaments were examined by X-ray diffraction under identical conditions, and the sensitized plates were developed together. The superstretched material of the present invention exhibited markedly greater orientation than did the parent filament. The superstretched material exhibited 3 layer lines, less background scattering, sharper diffraction maxima, and 8 more reflections than the parent filament, which showed only 2 layer lines and considerable background scattering. The fiber axes in the superstretched material had an average deviation of only about 2° from the stretching direction while those of the parent filament showed much greater average deviation.

Another comparison between the superstretched and the parent filaments was made on the basis of their respective hysteresis curves. Samples of the filaments were clamped in the jaws of a standard Scott tensile tester, and a load applied. The elongation resulting was traced on a standard chart. The load was released, and the return curve traced on the same chart. The return curve, in the case of the superstretched filament, joined the elongation curve at the zero point, while that of the parent filament returned to the base line of the chart displaced several units from the zero point, showing that an increase in length had resulted from the load applied. The superstretched material, being substantially fully oriented, did not acquire any additional permanent length. Thus, the superstretched filaments, when tightly fitted in a tennis racquet or in a viol can be relied upon to remain taut, while a cold-stretched filament will become somewhat longer, and hence less taut, on standing or in use.

The invention has been illustrated with respect to a particular plasticized vinylidene chloride-vinyl chloride composition. It has been applied as well, and with similar results to other crystalline vinylidene chloride polymers, both plasticized and unplasticized. The basic polymeric body in the compositions which may be used, it has been found, is any vinylidene chloride polymer or copolymer which exhibits that submicroscopic crystallinity which can be detected by X-ray diffraction methods. The polymeric body may contain vinyl chloride, vinyl acetate, vinyl cyanide, ethyl acrylate, methyl methacrylate, allyl acetate, chloroallyl chloroacetate, styrene, or any of numerous other compounds co-polymerized with vinylidene chloride in proportion to produce a crystalline polymer.

The invention is not limited to the production of superstretched filaments, but may be applied as well to the production of superstretched films, tapes, or sheets of crystalline vinylidene chloride polymers from the oriented sheets which may have been made, for example, by the method claimed in U. S. 2,183,602.

I claim:
1. The method of treating a formed article of a crystalline vinylidene chloride polymer possessing orientation parallel to a major surface of the article which includes: heating said article to a temperature in the range between its softening point and a temperature about 50 centigrade degrees therebelow while applying tension short of the breaking load for said article until a permanent elongation is obtained.

2. The method of treating a formed article of a crystalline vinylidene chloride polymer possessing orientation parallel to a major surface of the article which includes: heating said article to a temperature in the range between its softening point and a temperature about 50 centigrade degrees therebelow while applying tension short of the breaking load for said article until a permanent elongation is obtained and cooling said article while under tension.

3. The method which includes: heating a film of a crystalline vinylidene chloride polymer possessing orientation parallel to a major surface of the film to a temperature in the range between its softening point and a temperature about fifty centigrade degrees therebelow, while applying tension short of the breaking load for said article until a permanent elongation of at least 50 per cent is obtained and cooling said article.

4. The method which includes: heating a filament of a crystalline vinylidene chloride polymer possessing linear orientation to a temperature in the range between its softening point and a temperature about fifty centigrade degrees therebelow, while applying tension short of the breaking load for said filament until a permanent elongation of about 50 per cent is obtained.

5. The method which includes: heating a filament of a crystalline vinylidene chloride polymer possessing linear orientation to a temperature in the range between its softening point and a temperature about fifty centigrade degrees therebelow, while applying tension short of the breaking load for said filament until a permanent elongation of about 50 per cent is obtained and cooling said filament while under tension.

6. The method which includes: heating a filament of a crystalline vinylidene chloride polymer possessing linear orientation to a temperature in the range between its softening point and a temperature about fifty centigrade degrees therebelow, in a liquid non-solvent bath inert to the said filament, while applying tension short of the breaking load for said filaments until a permanent elongation of from 80 to 150 per cent is obtained and cooling said filament while under tension.

7. The method as claimed in claim 6 wherein the filament is of a crystalline composition of a vinylidene chloride-vinyl chloride copolymer.

8. The method as claimed in claim 6 wherein the filament is of a crystalline composition of a copolymer of about 90 per cent vinylidene chloride and correspondingly about 10 per cent vinyl chloride.

ERNEST H. HARDER.